US005451123A

United States Patent [19]

Fertitta, Jr.

[11] Patent Number: 5,451,123

[45] Date of Patent: Sep. 19, 1995

[54] RECHARGEABLE PORTABLE ROUTING TOOL

[76] Inventor: Salvatore Fertitta, Jr., 1109 Regina Dr., Baltimore, Md. 21227

[21] Appl. No.: 268,964

[22] Filed: Jun. 30, 1994

[51] Int. Cl.[6] .......... B23C 1/20; B27C 5/10

[52] U.S. Cl. .......... 409/182; 144/134 D

[58] Field of Search .......... 409/181, 182; 144/136 C, 134 D; 310/47; 388/815

[56] References Cited

U.S. PATENT DOCUMENTS

| | | | |
|---|---|---|---|
| 4,056,136 | 11/1977 | Miller | 409/181 |
| 4,655,653 | 4/1987 | Hall et al. | 409/182 |
| 4,674,548 | 6/1987 | Mills et al. | 409/182 X |
| 4,696,331 | 9/1987 | Irland | 409/182 |
| 5,003,628 | 3/1991 | Houser | 388/815 |
| 5,298,821 | 3/1994 | Michel | 310/47 |

*Primary Examiner*—William Briggs

[57] ABSTRACT

A rechargeable portable routing tool comprising a router having a hollow and gripable housing, an electric motor having a fixed stator secured within the housing and a rotatable rotor extended therefrom, a bit fastener mechanism for receivably coupling a bit to the rotor for trimming, and a power circuitry mechanism for receiving electrical power and selectively controlling its application for rotating the rotor; at least one rechargeable battery coupleable to the power circuitry mechanism and housing of the router for supplying electrical power; and a recharging mechanism adapted to be coupled with an external power source and coupleable with the battery for recharging it with electrical power.

1 Claim, 4 Drawing Sheets

RECHARGEABLE PORTABLE ROUTING TOOL

BACKGROUND OF THE INVENTION

1. Field of the Invention

The present invention relates to a rechargeable portable routing tool and more particularly pertains to trimming laminate plastics with a rechargeable portable routing tool.

2. Description of the Prior Art

The use of routers is known in the prior art. More specifically, routers heretofore devised and utilized for the purpose of trimming materials are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 272,709 to Atherton discloses a power tool for laminate trimming and edge finishing. U.S. Pat. No. 3,628,579 to Roche discloses a plastic laminate trimmer. U.S. Pat. No. 4,027,575 to White discloses a router for trimming laminate plastics. U.S. Pat. No. 4,655,653 to Hall et al. discloses a router. U.S. Pat. No. 4,827,996 to Cotton et al. discloses a power tool for trimming laminate.

While these devices fulfill their respective, particular objective and requirements, the aforementioned patents do not describe a rechargeable portable routing tool that functions similarly to conventional routing tools but may be portably transported from one location to another and operated in locations remote from conventional external power sources with a rechargeable power supply.

In this respect, the rechargeable portable routing tool according to the present invention substantially departs from the conventional concepts and designs of the prior art, and in doing so provides an apparatus primarily developed for the purpose of trimming laminate plastics.

Therefore, it can be appreciated that there exists a continuing need for new and improved rechargeable portable routing tool which can be used for trimming laminate plastics. In this regard, the present invention substantially fulfills this need.

SUMMARY OF THE INVENTION

In the view of the foregoing disadvantages inherent in the known types of routers now present in the prior art, the present invention provides an improved rechargeable portable routing tool. As such, the general purpose of the present invention, which will be described subsequently in greater detail, is to provide a new and improved rechargeable portable routing tool and method which has all the advantages of the prior art and none of the disadvantages.

To attain this, the present invention essentially comprises, in combination, a router. The router includes a hollow, rigid, and essentially cylindrical housing having a sealed upper end and an opened lower end. The router includes a plurality of handles secured periphery about the housing for allowing a user a firm grip thereof. The router includes an electric motor having a fixed stator secured within the housing, a rotatable rotor extended from lower end of the housing, and a terminal end coupled thereto for receiving electrical power for imparting rotational movement to the rotor. The router includes a bit fastener having an upper end coupled to the rotor of the motor and a lower end extended downwards for receivably holding a bit therein for trimming. The router includes a bit for trimming laminates removably secured within the lower end of the bit fastener. The router includes a female plug for receiving electrical power having a socket end disposed on the upper end of the housing and a terminal end extended within the housing. Lastly, the router includes a power switch having a terminal end coupled between the terminal end of the female plug and the terminal end of the motor and an orientable selector portion extended from the housing with the selector portion having one orientation for allowing the motor to receive electrical power and another orientation for preventing such reception.

A rechargeable power supply is provided. The power supply includes a hollow, rigid, and essentially cylindrical container having a sealed upper end and a sealed lower end. The power supply includes a plurality of rechargeable batteries secured within the container. The power supply includes a female plug having a socket end diametrically disposed on the container and a terminal end coupled with the batteries. The power supply includes a male plug having a terminal end extended within the container and pronged end extended from the lower end of the container with the pronged end mateable with the socket end of the female plug of the router. The power supply includes an enabling switch having a spring-loaded and depressible detent extended from the lower end of the housing and terminal end coupled between the batteries and the terminal end of the male plug. The detent is secured in an depressed orientation for allowing transmission of electrical power from the power supply to the router when the male plug of the power supply and the female plug of the router are properly mated, and the detent of the switch released from its depressed orientation for preventing such transmission.

A recharging unit is provided. The recharging unit includes a power converter for supplying converted electrical power at a level for recharging the batteries, the power converter has male plug extended therefrom for coupling with an external power source and a power cable extended therefrom for supplying converted electrical power. The recharging unit also includes a generally hollow, rigid, and U-shaped base portion having male plug secured thereto with the male plug having a terminal end coupled with the power cable of the power converter for receiving power and a pronged end mateable with the socket end of the female plug of the power supply for transferring power thereto for recharging its batteries.

Lastly, a stand is provided. The stand includes a generally rectangular and planar base with an aperture centrally disposed thereon for receiving the bit of the router. The stand includes an arm extended upwards from the base. The stand also includes adjustment means coupled between the arm and router with the adjustment means allowing the router to be pivoted as well as moved upwards and downwards with respect to the base.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved rechargeable portable routing tool which has all the advantages of the prior art routers and none of the disadvantages.

It is another object of the present invention to provide a new and improved rechargeable portable routing tool which may be easily and efficiently manufactured and marketed.

It is a further object of the present invention to provide a new and improved rechargeable portable routing tool which is of durable and reliable construction.

An even further object of the present invention is to provide a new and improved rechargeable portable routing tool which is susceptible of a low cost of manufacture with regard to both materials and labor, and which accordingly is then susceptible of low prices of sale to the consuming public, thereby making such a rechargeable portable routing tool economically available to the buying public.

Still yet another object of the present invention is to provide a new and improved rechargeable portable routing tool which provides in the apparatuses and methods of the prior art some of the advantages thereof, while simultaneously overcoming some of the disadvantages normally associated therewith.

Even still another object of the present invention is to provide a new and improved rechargeable portable routing tool for trimming laminate plastics.

Lastly, it is an object of the present invention to provide a new and improved rechargeable portable routing tool comprising a router having a hollow and gripable housing, an electric motor having a fixed stator secured within the housing and a rotatable rotor extended therefrom, bit fastener means for receivably coupling a bit to the rotor for trimming, and power circuitry means for receiving electrical power and selectively controlling its application for rotating the rotor; at least one rechargeable battery coupleable to the power circuitry means and housing of the router for supplying electrical power; and recharging means adapted to be coupled with an external power source and coupleable with the battery for recharging it with electrical power.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
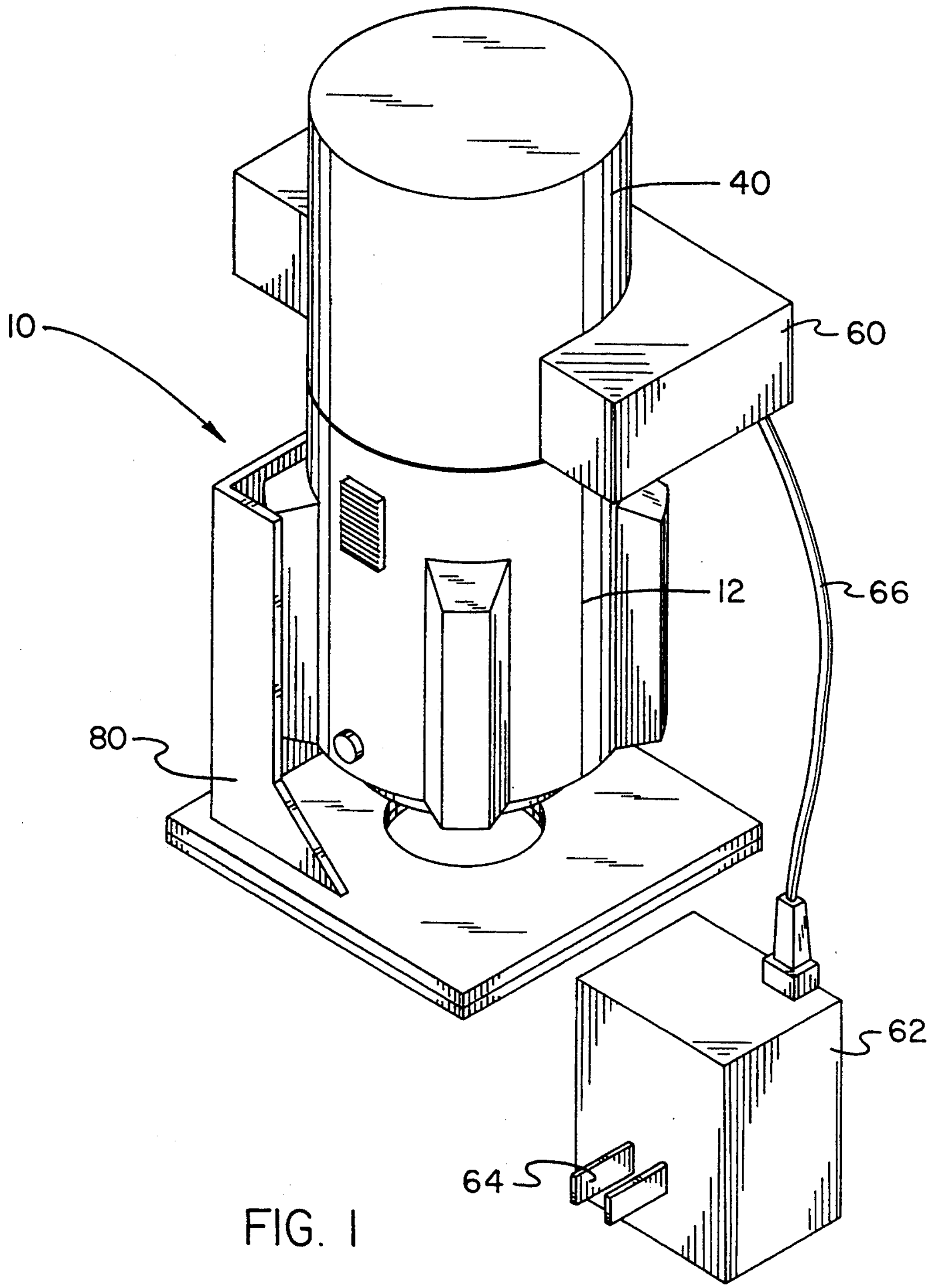
FIG. 1 is a perspective view of the preferred embodiment of the rechargeable portable routing tool constructed in accordance with the principles of the present invention.
Figure 2:
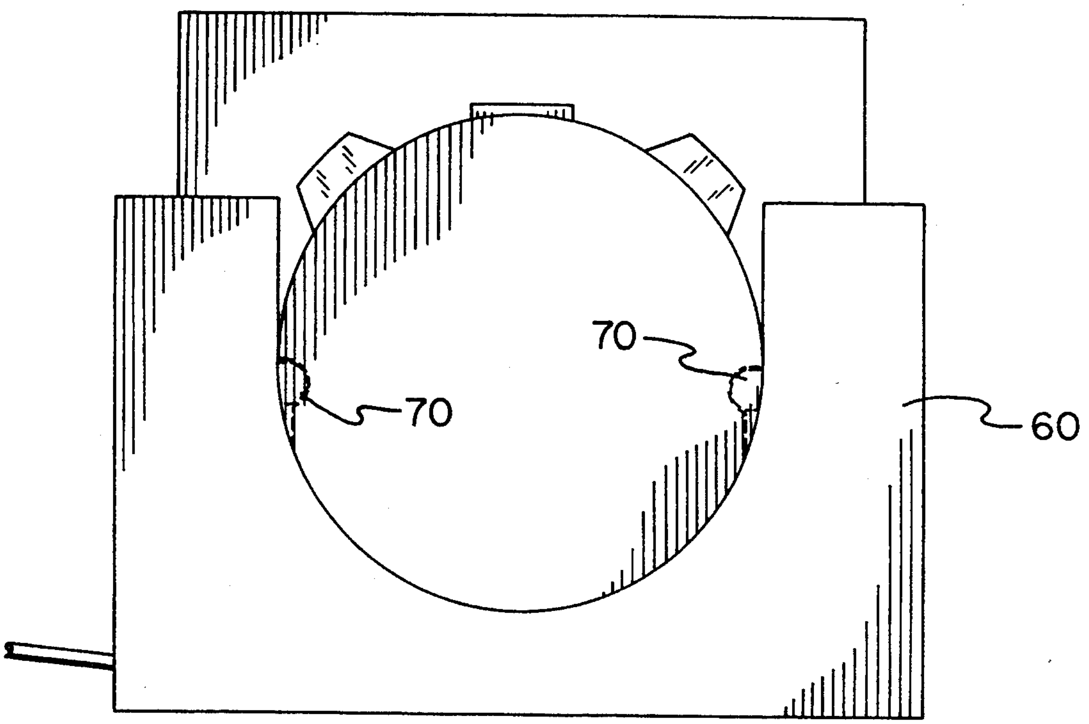
FIG. 2 is a plan view of the present invention as depicted in FIG. 1.
Figure 3:
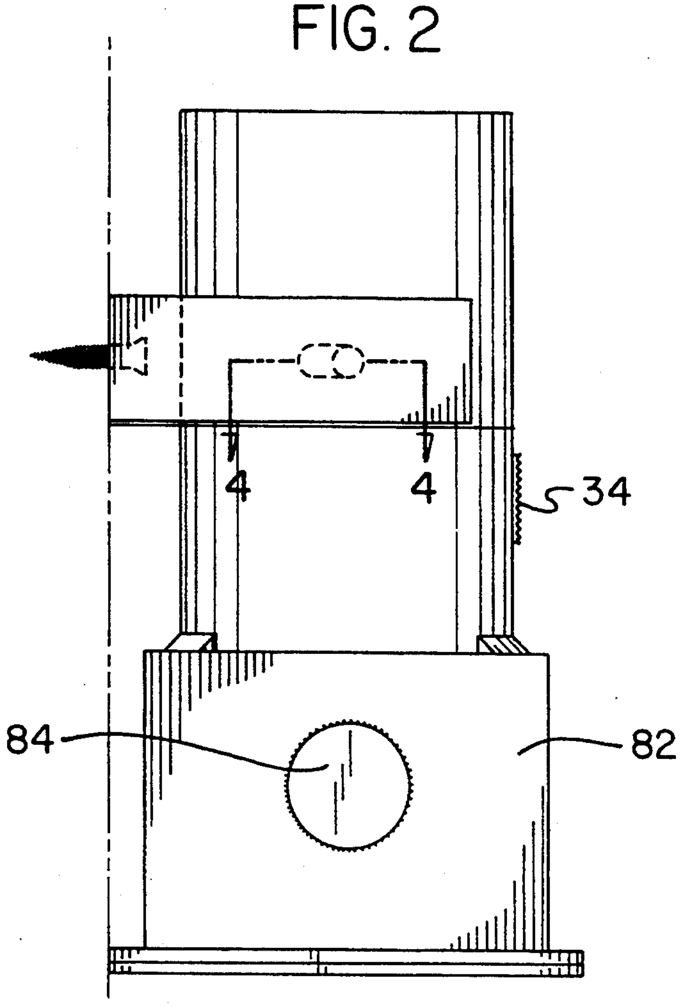
FIG. 3 is a side-elevational view of the present invention with the recharging unit thereof secured to a wall.
Figure 4:
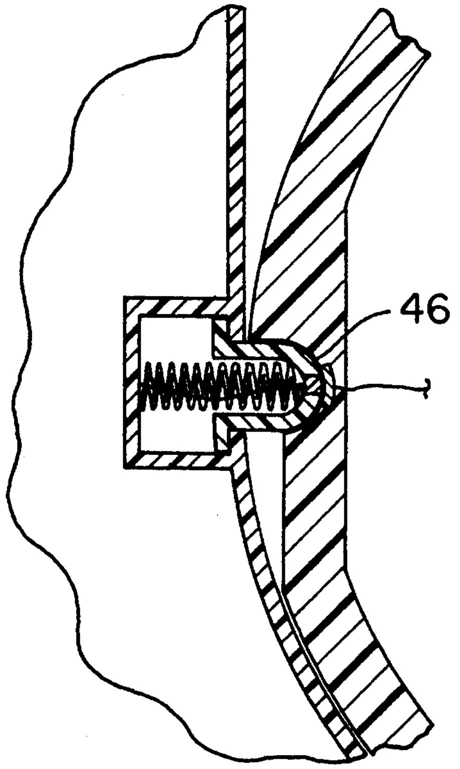
FIG. 4 is a cross-sectional view of the coupling between the router and the recharging unit.
Figure 5:
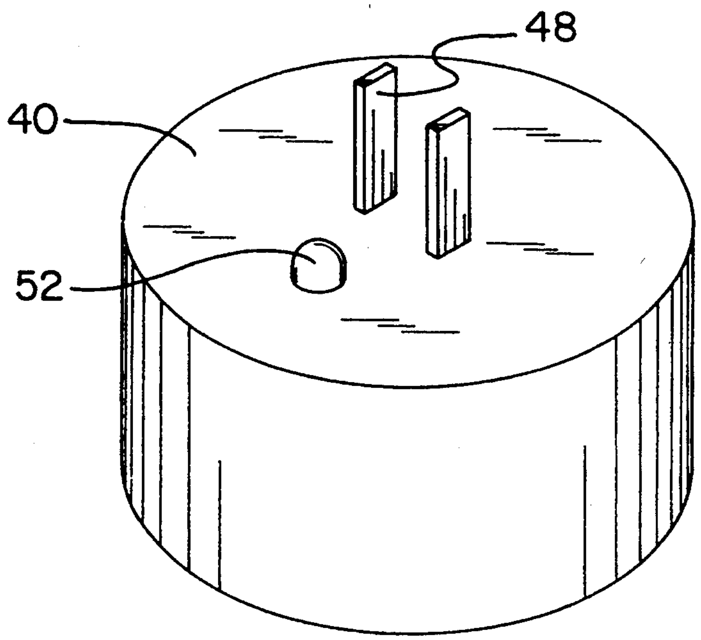
FIG. 5 is a perspective view of the rechargeable power supply of the present invention.
Figures 6, 7:
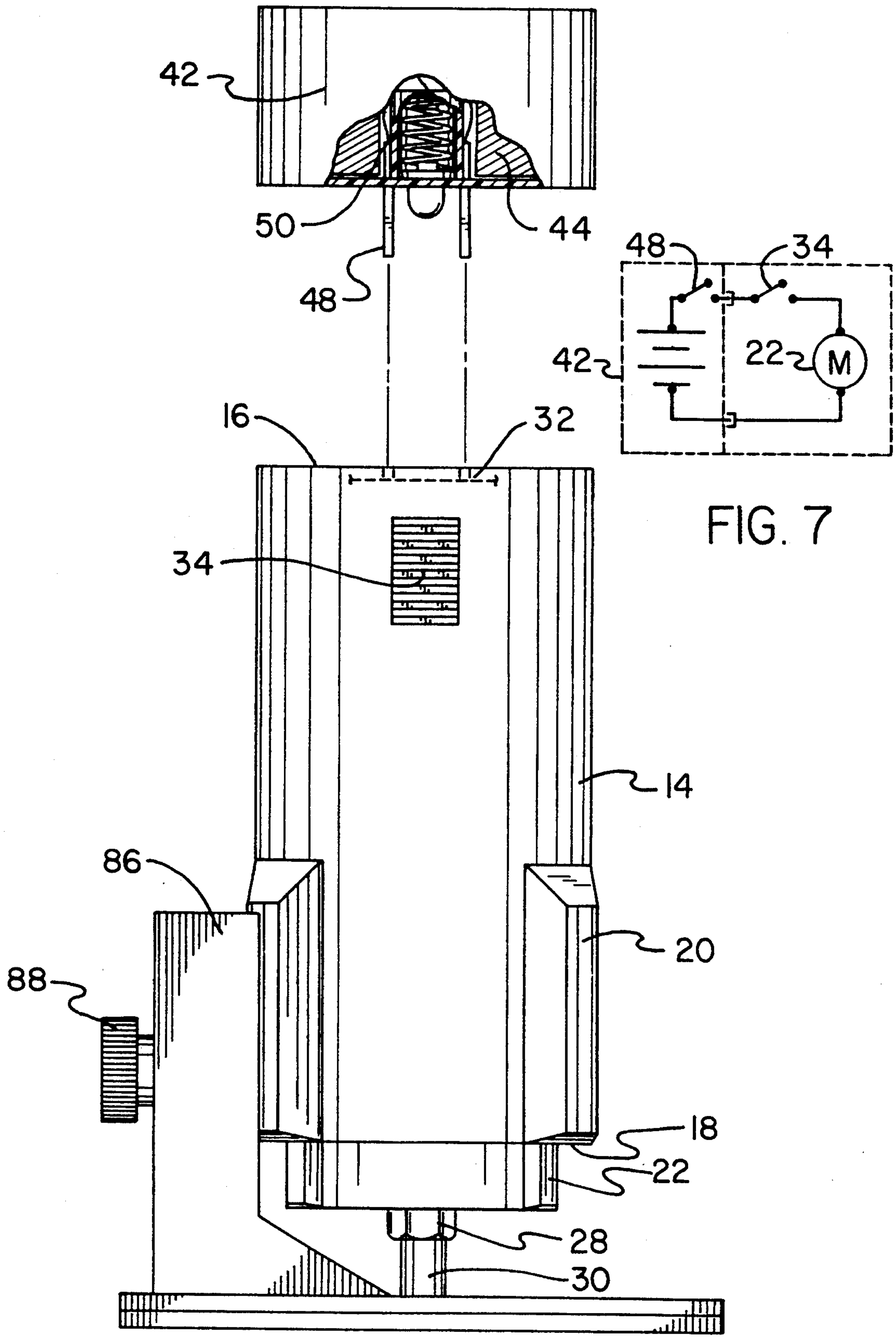
FIG. 6 is a side-elevational view of the present invention with a portion of the rechargeable power supply removed for depicting the coupling between it and the housing.
FIG. 7 is an electrical schematic of the present invention.

With reference now to the drawings, and in particular, to FIG. 1 thereof, the preferred embodiment of the new and improved rechargeable portable routing tool embodying the principles and concepts of the present invention and generally designated by the reference number 10 will be described.

Specifically, the present invention includes four major components. The major components are the router, power supply, recharging unit, and stand. These components are interrelated to provide the intended function.

More specifically, it will be noted in the various Figures that the first major component is the router 12. The router includes seven subcomponents. The subcomponents are the housing, handles, motor, fastener, bit, female plug, and power switch. These subcomponents are interrelated to allow the router to perform its intended function.

The first subcomponent of the router is the housing 14. The housing is hollow, rigid, and essentially cylindrical in structure. The housing is formed of plastic or metal. It has a sealed upper end 16 and an open lower end 18. The housing serves as a support for holding the other subcomponents in a fixed configuration for use.

The second subcomponent of the router is the handles 20. The present invention includes a plurality of handles. The handles are formed of a gripable material such as plastic. The handles are elongated in structure and are parallelly aligned with the central axis of the housing. The handles allow a user a firm grip of the housing.

The third subcomponent of the router is the motor 22. The motor has a fixed stator secured within the housing. The motor also has a rotatable rotor extended from the lower end 18 of the housing. The motor is adapted to operate from electrical power. An electrically conductive terminal end is coupled to the motor for receiving electrical power for imparting rotational movement to the rotor. The motor is designed to produce sufficient torque for enabling laminates to be efficiently routed.

The fourth subcomponent of the router is the bit fastener 28. The bit fastener is rigid in structure. It has an upper end coupled to the rotor of the motor. The bit fastener also has a lower end extended downwards therefrom. The lower end of the bit fastener is adapted for receivably holding a bit therein for trimming. The bit fastener is further adapted for holding a variety of different sized bits therein for trimming laminates.

The fifth subcomponent of the router is the bit 30. The bit is used for trimming laminates. It is removably secured within the lower end of the bit fastener. A plurality of different type bits may be used and coupled within the bit fastener for achieving a variety of different cuts.

The sixth subcomponent of the router is the female plug 32. The female plug is electrically conductive. It is adapted for receiving electrical power. It has a socket end disposed on the upper end of the housing. The plug also has a terminal end extended within the housing.

The seventh subcomponent of the router is the power switch 34. The power switch is electrically conductive. It has a terminal end coupled between the terminal end of the female plug and the terminal end of the motor. The power switch also has an orientable selector portion. The selector portion is extended from the housing and adapted to be actuated by a user. The selector portion has one orientation for allowing the motor to receive electrical power and another orientation for preventing such reception. The surface of the selector portion is knurled in structure for allowing a user a firm grip.

The second major component is the power supply 40. The power supply is adapted for supplying electrical power and adapted to be electrically recharged. The power supply includes five subcomponents. The subcomponents are the container, batteries, female plug, male plug, and enabling switch. These subcomponents are interrelated to allow the power supply to perform its intended function.

The first subcomponent of the power supply is the container 42. The container is hollow, rigid, and essentially cylindrical in structure. The container is formed of plastic or metal. It has a sealed upper end and a sealed lower end. The container is used for holding the other subcomponents of the power supply in a fixed configuration for use.

The second subcomponent of the power supply is the batteries 44. The present invention includes a plurality of batteries. The batteries are electrically rechargeable in structure. They are secured within the container. Commercially available and conventional rechargeable batteries may be utilized in the present invention.

The third subcomponent of the power supply is the female plug 46. The female plug is electrically conductive. It has a socket end diametrically disposed on the container. The female plug also has a terminal end coupled with the batteries in the container.

The fourth subcomponent of the power supply is the male plug 48. The male plug is electrically conductive. It has a terminal end extended within the container. The male plug also has a pronged end extended from the lower end of the container. The pronged end is mateable with the socket end of the female plug 32 of the router.

The fifth subcomponent of the power supply is the enabling switch 50. The enabling switch is electrically conductive and has a spring-loaded and depressible detent 52 extended from the lower end of the housing. The enabling switch also has a terminal end coupled between the rechargeable batteries 44 and the terminal end of the male plug 48. The detent is secured in a depressed orientation for allowing transmission of electrical power from the power supply to the router 12 when the male plug 48 of the power supply and the female plug 32 of the router are properly mated. They are properly mated when the container of the power supply is abutted against the housing of the router. The detent of the switch is released from its depressed orientation for preventing such transmission. This occurs when the container of the power supply is decoupled from the housing of the router.

The third major component is the recharging unit 60. The recharging unit includes two subcomponents. The subcomponents are the power converter and the base portion. These subcomponents are interrelated to allow the recharging unit to perform its intended function.

The first subcomponent of the recharging unit is the power converter 62. The power converter converts electrical power from an external power source to a level for recharging the batteries. The power converter has a male plug 64 extended therefrom. The male plug is used for coupling the power converter with an external power source such as conventional household power. The power converter also has a power cable 66 extended therefrom. The power cable supplies the converted electrical power for use.

The second subcomponent of the recharging unit is the base portion 68. The base portion is generally hollow, rigid, and U-shaped in structure. It is formed of plastic or metal. The base portion has a long leg with two cross legs extended in parallel therefrom. The base portion also includes a male plug 70 with a pronged end. The male plug is electrically conductive. The prongs of the male plug are coupled to the cross legs of the base portion such that they oppose each other. The male plug has a terminal end extended from the prongs and coupled with the power cable 66 of the power converter. This terminal end is used for receiving power from cable of the power converter. The pronged end of the male plug is mateable with the socket end of the female plug 46 of the power supply. When the male and female plug are coupled together, electrical power may be transferred from the power converter for recharging the batteries. This electrical power may be used to operate the router directly instead of using the power supply. Furthermore, once the male plug 70 is mated with the female plug 66 of the power supply, the base portion is rigidly fastened to the power supply. In this configuration, the base portion may be fastened to a wall or other similar rigid structure for holding the power supply and accompanying router in a fixed orientation.

The fourth major component is the stand 80. The stand is formed of plastic or metal. The stand includes three subcomponents. The subcomponents are the base, arm, and adjustment means. These subcomponents are interrelated to allow the stand to perform its intended function.

The first subcomponent of the stand is the base 82. The base is generally rectangular, rigid, and planar in structure. The base has an aperture 84 centrally disposed thereon. This aperture is adapted for receiving the bit 30 of the router. The aperture allows the bit to be placed at position for cutting.

The second subcomponent of the stand is the arm 86. The arm is rigid in structure. It is extended upwards from the base. The arm is adapted for holding the router in a position over the base.

The third subcomponent of the stand is the adjustment means 88. The adjustment means is coupled between the arm 86 and the router 12. The adjustment means allows the router 12 to be pivoted as well as moved upwards and downwards with respect to the base. In the preferred embodiment, the adjustment means consists of a screw disposed through an elongated slot on the arm. This screw is then secured to the router. The screw has a knurled knob thereon for allowing a user a firm grip when adjusting of the height of the router from the base of the stand.

The present invention is a routing tool which is used to trim laminates, such as those which are laid on counter tops to obtain a very attractive and durable surface. Laminates are very hard and require great care in finishing the edges to prevent them from chipping. This is usually done with a router, which machines the material off, similar to a milling machine cutter. The routers are hand held, with a motor which drives a vertical bit or spindle that holds the cutting tool that protrudes through a base mounted on the unit. In use, the base is set on the surface of the laminate and the position of the tool is adjusted up or down so it can trim the edges as it is moved against them. The cutting action produced a smoothly finished surface on the edges of the laminates.

Prior art hand held routers have long cords which are plugged into nearby electrical outlets to obtain power. Extension cords are often needed to reach the outlets. Since many electrical tools may be in use in the area, the cords represent a hazard and often must be disentangled to change locations. In some cases, there are no nearby outlets to be found. These are problems which would be unnecessary if the tools were cordless. The present invention solves this problem, since it is similar to a conventional router yet is totally self contained and operated from storage batteries incorporated into the housing. The batteries are of the rechargeable type and are restored by simply plugging a power adapter into an external power supply. Cordless tools are very practical and convenient. They are now available in various types, and this invention could be added to the list.

The present invention is capable of maintaining the same speed and torque as those prior art routers that are electrically energized through a power cable. The present invention can also include a transparent eye shield coupleable to the stand. An additional plate consisting of a sheet of formica about 1/16" thick can be coupled to the base portion of the stand to prevent laminates from being scratched or cut when routing. The present invention can be utilized with electrical power supplied directly from an external power source through the power converter or in a portable mode using electrical power supplied through the rechargeable power supply.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A rechargeable portable routing tool for trimming laminate plastics comprising, in combination:

a router further comprising:

- a hollow, rigid, and essentially cylindrical housing having a sealed upper end and an opened lower end;
- a plurality of handles secured periphery about the housing for allowing a user a firm grip thereof;
- an electric motor having a fixed stator secured within the housing, a rotatable rotor extended from lower end of the housing, and a terminal end coupled thereto for receiving electrical power for imparting rotational movement to the rotor;
- a bit fastener having an upper end coupled to the rotor of the motor and a lower end extended downwards for receivably holding a bit therein for trimming;
- a bit for trimming laminates removably secured within the lower end of the bit fastener;
- a female plug for receiving electrical power having a socket end disposed on the upper end of the housing and a terminal end extended within the housing; and
- a power switch having a terminal end coupled between the terminal end of the female plug and the terminal end of the motor and an orientable selector portion extended from the housing with the selector portion having one orientation for allowing the motor to receive electrical power and another orientation for preventing such reception;

a rechargeable power supply further comprising:

- a hollow, rigid, and essentially cylindrical container having a sealed upper end and a sealed lower end;

a plurality of rechargeable batteries secured within the container;

an female plug having a socket end diametrically disposed on the container and a terminal end coupled with the batteries;

a male plug having a terminal end extended within the container and pronged end extended from the lower end of the container with the pronged end mateable with the socket end of the female plug of the router;

an enabling switch having a spring-loaded and depressible detent extended from the lower end of the housing and terminal end coupled between the batteries and the terminal end of the male plug, the detent secured in an depressed orientation for allowing transmission of electrical power from the power supply to the router when the male plug of the power supply and the female plug of the router are properly mated, the switch released from its depressed orientation for preventing such transmission;

a recharging unit further comprising:

a power converter for supplying converted electrical power at a level for recharging the batteries, the power converter having male plug extended therefrom for coupling with an external power source and a power cable extended therefrom for supplying converted electrical power; and a generally hollow, rigid, and U-shaped base portion having male plug secured thereto, the male plug having a terminal end coupled with the power cable of the power converter for receiving power and a pronged end mateable with the socket end of the female plug of the power supply for transferring power thereto for recharging its batteries; and a stand further comprising:

a generally rectangular and planar base with an aperture centrally disposed thereon for receiving the bit of the router;

an arm extended upwards from the base; and adjustment means coupled between the arm and router, the adjustment means allowing the router to be pivoted as well as moved upwards and downwards with respect to the base.

* * * * *